(12) United States Patent
Humphrey et al.

(10) Patent No.: US 7,295,939 B2
(45) Date of Patent: Nov. 13, 2007

(54) HARDWARE IMPLEMENTATION OF THE PSEUDO-SPECTRAL TIME-DOMAIN METHOD

(75) Inventors: John R. Humphrey, Newark, DE (US); James P. Durbano, Ridley Park, PA (US); Dennis W. Prather, Landenberg, PA (US)

(73) Assignee: EM Photonics, Inc., Newark, DE (US)

( * ) Notice: Subject to any disclaimer, the term of this patent is extended or adjusted under 35 U.S.C. 154(b) by 150 days.

(21) Appl. No.: 10/517,224

(22) PCT Filed: Jun. 24, 2003

(86) PCT No.: PCT/US03/20259

§ 371 (c)(1),
(2), (4) Date: Dec. 8, 2004

(87) PCT Pub. No.: WO04/001557

PCT Pub. Date: Dec. 31, 2003

(65) Prior Publication Data

US 2005/0154546 A1 Jul. 14, 2005

Related U.S. Application Data

(60) Provisional application No. 60/390,933, filed on Jun. 24, 2002.

(51) Int. Cl.
*G01R 23/16* (2006.01)
(52) U.S. Cl. .......................... 702/77; 702/57
(58) Field of Classification Search ................ 702/182, 702/57, 196, 77
See application file for complete search history.

(56) References Cited

U.S. PATENT DOCUMENTS

| 5,680,515 | A | 10/1997 | Barhen et al. |
| 6,366,872 | B1 * | 4/2002 | Fetler .......................... 702/189 |
| 6,377,041 | B1 | 4/2002 | Jones, Jr. et al. |
| 6,434,583 | B1 * | 8/2002 | Dapper et al. .............. 708/409 |
| 6,507,804 | B1 | 1/2003 | Hala et al. |
| 6,512,789 | B1 | 1/2003 | Mirfakhraei |
| 6,584,138 | B1 | 6/2003 | Neubauer et al. |
| 6,785,341 | B2 * | 8/2004 | Walton et al. .............. 375/267 |

(Continued)

OTHER PUBLICATIONS

A. Taflove, "Computer Electrodynamics: The Finite-Difference Time-Domain Method," pp. 68-70 (May 1995).

(Continued)

*Primary Examiner*—Eliseo Ramos-Feliciano
*Assistant Examiner*—Anthony Gutierrez
(74) *Attorney, Agent, or Firm*—Connolly Bove Lodge & Hutz LLP

(57) ABSTRACT

A computer hardware configuration for performing the pseudo-spectral time-domain (PSTD) method on data. The hardware configuration includes a forward fast Fourier transform (FFT) unit that calculates a forward fast Fourier transform (FFT) from the data, and a complex multiplication unit that receives the FFT-processed data and calculates a spatial derivative in the frequency domain from the FFT-processed data. The hardware configuration further includes an inverse fast Fourier transform (IFFT) unit that converts the spatial derivative in the frequency domain from the complex multiplication unit into the time domain, and a computation engine that solves a PSTD equation based upon the spatial derivative in the time domain received from the IFFT unit.

20 Claims, 2 Drawing Sheets

U.S. PATENT DOCUMENTS

| | | | |
|---|---|---|---|
| 6,952,460 B1* | 10/2005 | Van Wechel et al. | 375/350 |
| 6,956,815 B2* | 10/2005 | Chiodini | 370/210 |
| 2004/0143439 A1* | 7/2004 | Kang et al. | 704/262 |

OTHER PUBLICATIONS

Q.H. Liu, " The PSTD Algorithm: A Time-Domain Method Requiring Only Two Cells Per Wavelength," *Microwave and Optical Technology Letters*, vol. 15, No. 3 (Jun. 1997).

Q.H. Liu, "PML and PSTD Algorithm for Arbitrary Lossy Anisotropic Media," *IEEE Microwave and Guided Wave Letters*, vol. 9, No. 2 (Feb. 1999).

Q.H. Liu, "Large-Scale Simulations of Electromagnetic and Acoustic Measurements Using the Pseudospectral Time-Domain (PSTD) Algorithm," *IEEE Transactions on Geoscience and Remote Sensing*, vol. 37, No. 2 (Mar. 1999).

Y.F. Leung et al., "Pseudospectral Time-Domain PSTD) Method With Unsplit-Field PML," *Microwave and Optical Technology Letters*, vol. 22, No. 4 (Aug. 1999).

Q. Li et al., "Comparison Study Of The PSTD And FDTD Methods For Scattering Analysis," *Microwave and Optical Technology Letters*, vol. 25, No. 3 (May 2000).

W.K. Leung et al., "Transformed-Space Nonuniform Pseudospectral Time-Domain Algorithm," *Microwave and Optical Technology Letters*, vol. 28, No. 6 (Mar. 2001).

* cited by examiner

HARDWARE IMPLEMENTATION OF THE PSEUDO-SPECTRAL TIME-DOMAIN METHOD

CLAIM FOR PRIORITY

The present application is a U.S. National Stage application filed under 35 U.S.C. § 371, claiming priority of International Application No. PCT/US2003/020259, filed Jun. 24, 2003, and U.S. Provisional Patent Application Ser. No. 60/390,993, filed Jun. 24, 2002, respectively, under 35 U.S.C. §§ 119 and 365, the disclosures of the above-referenced applications being incorporated by reference herein in their entireties.

BACKGROUND OF THE INVENTION

A. Field of the Invention

The present invention relates generally to hardware accelerators, and, more particularly to a hardware implementation of the pseudo-spectral time-domain (PSTD) method.

B. Description of the Related Art

Since the advent of the modem computer, a great deal of effort has gone into the development of numerical algorithms for the rigorous solution of electromagnetic problems. Today, popular numerical approaches include the finite-element method (FEM), method of moments (MOM), modal expansion techniques, boundary integral methods, and time-domain methods such as the finite-volume time-domain (FVTD), multi-resolution time-domain (MRTD), and the finite-difference time-domain (FDTD) methods. Each of these algorithms possesses clear advantages and disadvantages depending on the specific application. One algorithm in particular, the pseudo-spectral time-domain (PSTD) method shows particular promise. In comparison to the above methods, the PSTD technique can require far less memory while maintaining, and in fact improving, the accuracy and versatility of electromagnetic analysis. To this end, recent numerical experiments have confirmed that, for a fixed amount of computational resources, the PSTD method can analyze problems two to three orders of magnitude larger than an FDTD method with the same level of accuracy.

However, one of the difficulties of the PSTD method is the large number of forward and inverse Fast Fourier Transforms (FFTs and IFFTs) that need to be computed, which significantly slow down the analysis. In comparison to the FDTD method, which has order N computational dependence, the PSTD method has order NlogN. Thus, from a pure software point of view, the PSTD method is far less appealing from a computational resources point of view.

Over the last several decades, significant effort has been put into realizing application-specific integrated circuits (ASICs) for application to digital signal processing (DSP). As a result, ASICs are currently available that perform the FFT and IFFT operations in fractions of a microsecond. Thus, the PSTD method is far more attractive to implement in hardware than the FDTD method, due to the wealth of technology that it can leverage. While the FDTD method can also be realized in hardware, it suffers from the fact that it requires extraordinary amounts of computer memory. In comparison, the PSTD method can analyze problems two to three orders of magnitude larger than other full-wave techniques, the FDTD method in particular, with the same level of accuracy.

Despite the advantages of the FDTD acceleration hardware over software-based implementations, the FDTD method requires a tremendous amount of memory. This can greatly limit the size of the problems that are capable of being solved. Because the PSTD method requires fewer samples than the FDTD method (on the order of 1000 times fewer), much larger problems can be solved with the PSTD method given the same amount of memory.

Although PSTD methods are accurate and well defined, current computer system technology limits the speed at which we can perform these operations. To use the PSTD method to solve a non-trivial problem can take hours, days, weeks, months, etc. Some problems are even too large to be effectively solved due to time constraints.

Thus, there is a need in the art to overcome the limitations of the related art, and to provide for a practical, hardware implementation of the PSTD method.

SUMMARY OF THE INVENTION

The present invention solves the problems of the related art by providing a hardware-based PSTD processor that capitalizes on the large advancements in the area of application DSP ASICs. By combining the PSTD algorithm with modem DSP chips and large scale FPGAs, the PSTD processor will be capable of solving very large radiation problems in computation times short enough to enable iterative design. Given this potential, a hardware implementation of the PSTD method offers the ability to design an extraordinary array of electromagnetic problems that heretofore have been impossible.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description. It is to be understood that both the foregoing general description and the following detailed description are exemplary and explanatory only and are not restrictive of the invention, as claimed.

BRIEF DESCRIPTION OF THE DRAWING

The present invention will become more fully understood from the detailed description given hereinbelow and the accompanying drawing which are given by way of illustration only, and thus are not limitative of the present invention, and wherein.

DETAILED DESCRIPTION OF EMBODIMENTS OF THE INVENTION

Figure 1:
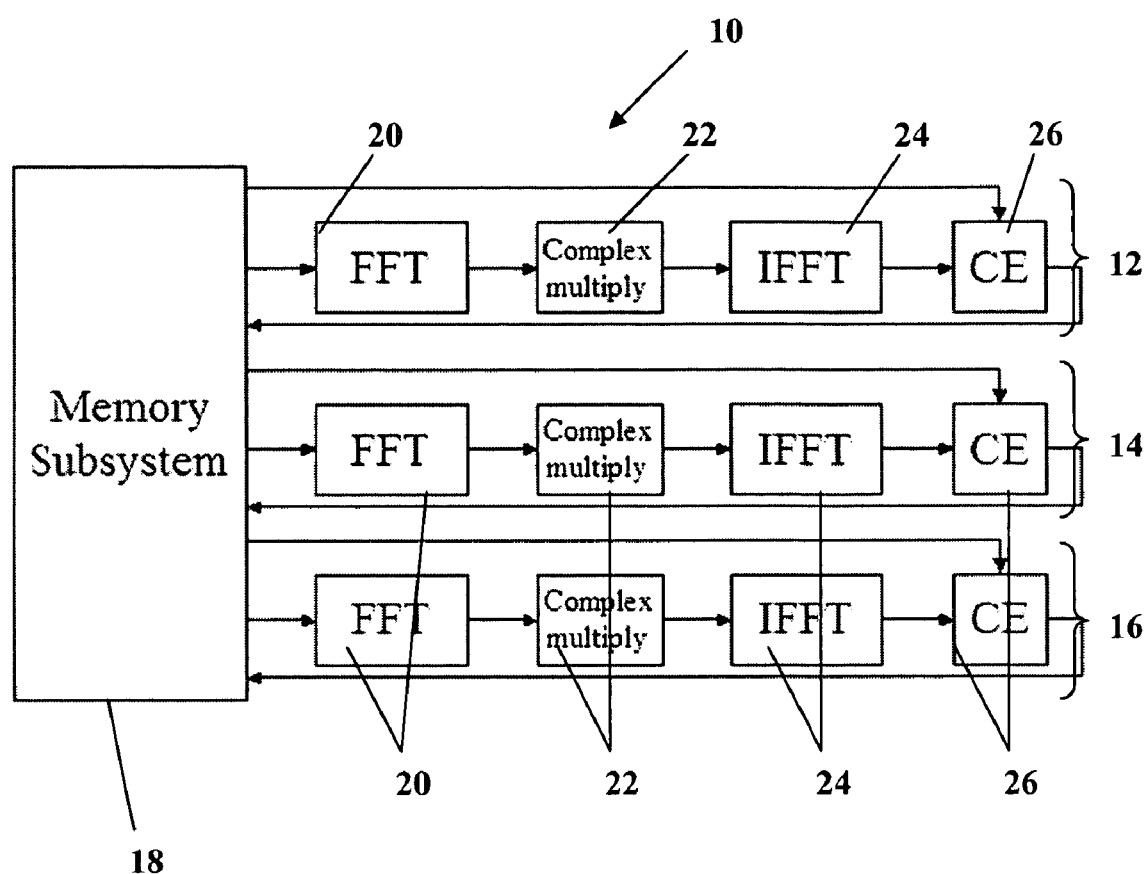
FIG. 1 is a schematic diagram showing a hardware implementation of the PSTD method in accordance with an embodiment of the present invention.

The following detailed description of the invention refers to the accompanying drawings. The same reference numbers in different drawings identify the same or similar elements. Also, the following detailed description does not limit the invention. Instead, the scope of the invention is defined by the appended claims and equivalents thereof.

Equations in the PSTD method take the following form:

$$E_{ab} = AE_{ab} + B\frac{\partial H_c}{\partial b} + CE_{ab}^{inc} \quad (1)$$

where a, b, and c are directions (x, y, or z), A, B, and C are coefficients based on the material properties of the medium, and $E^{inc}_{ab}$ is the incident field associated with the node.

Unlike the finite-difference time-domain (FDTD) method, where both spatial and temporal derivatives are represented by finite differences, the PSTD method uses FFTs and IFFTs to calculate the spatial derivatives. For example, recall from basic frequency-domain calculations that the spatial derivative of a field, $H_z$, in the y-direction can be written as:

$$\frac{\partial H_z}{\partial y} = IFFT(j^* k_y^* FFT(H_z(i,:,k))) \quad (2)$$

To compute the spatial derivative of $H_z$ in the y-direction for some node (i, j, k), all of the values of $H_z$ in the y-direction along the line (i, . . . , k) are required. Although this can require a tremendous amount of data to be fetched (depending on the mesh size), this operation only needs to be performed once for all values that require this derivative along this line. If there are N values in the y-direction, by fetching N values from memory, the spatial derivative in the y-direction for N different mesh points may be computed. Although there is a significant latency associated with the fetch operation, this operation only needs to be performed once per derivative, per timestep.

Despite the large amount of data required to perform the FFT/IFFT operations, it is possible to efficiently organize RAM to maximize throughput. For example, if the values of $H_z$ were stored in RAM in increasing-y order, it would be possible to perform a burst-read from RAM. Bursting allows the RAM to fetch contiguous locations very rapidly. Thus, burst reads allow fetching of all of the values necessary to compute the derivative, while, at the same time, maximizing the throughput of the RAM. Because spatial derivatives are required in the x, y, and z-directions, values would need to be stored in the RAM in three different patterns (increasing-x, increasing-y, and increasing-z). This would permit taking advantage of the bursting capabilities when computing any required derivative. Similarly, there will be three different "update" orders. The update order specifies the order in which nodes in the mesh will be updated. Updating nodes in the same order in which they are stored in RAM allows reuse of the spatial derivatives. Once the spatial derivative of a field is known in a specific direction, that value can be used to update any node along that line. Thus, by solving fields along that line, the same value can be used over and over again without incurring the latency of the RAM fetching and the FFT/IFFT operations.

FIG. 1 shows one logical data flow for a PSTD accelerator 10 in accordance with the present invention. Note that there are three parallel datapaths 12, 14, 16. These datapaths 12, 14, 16 are completely independent of one another (except for a memory subsystem 18) and each solves fields in a given direction (x, y, or z). Each of these datapaths 12, 14, 16 is responsible for solving an equation of the form shown in equation 1.

Figure 2:
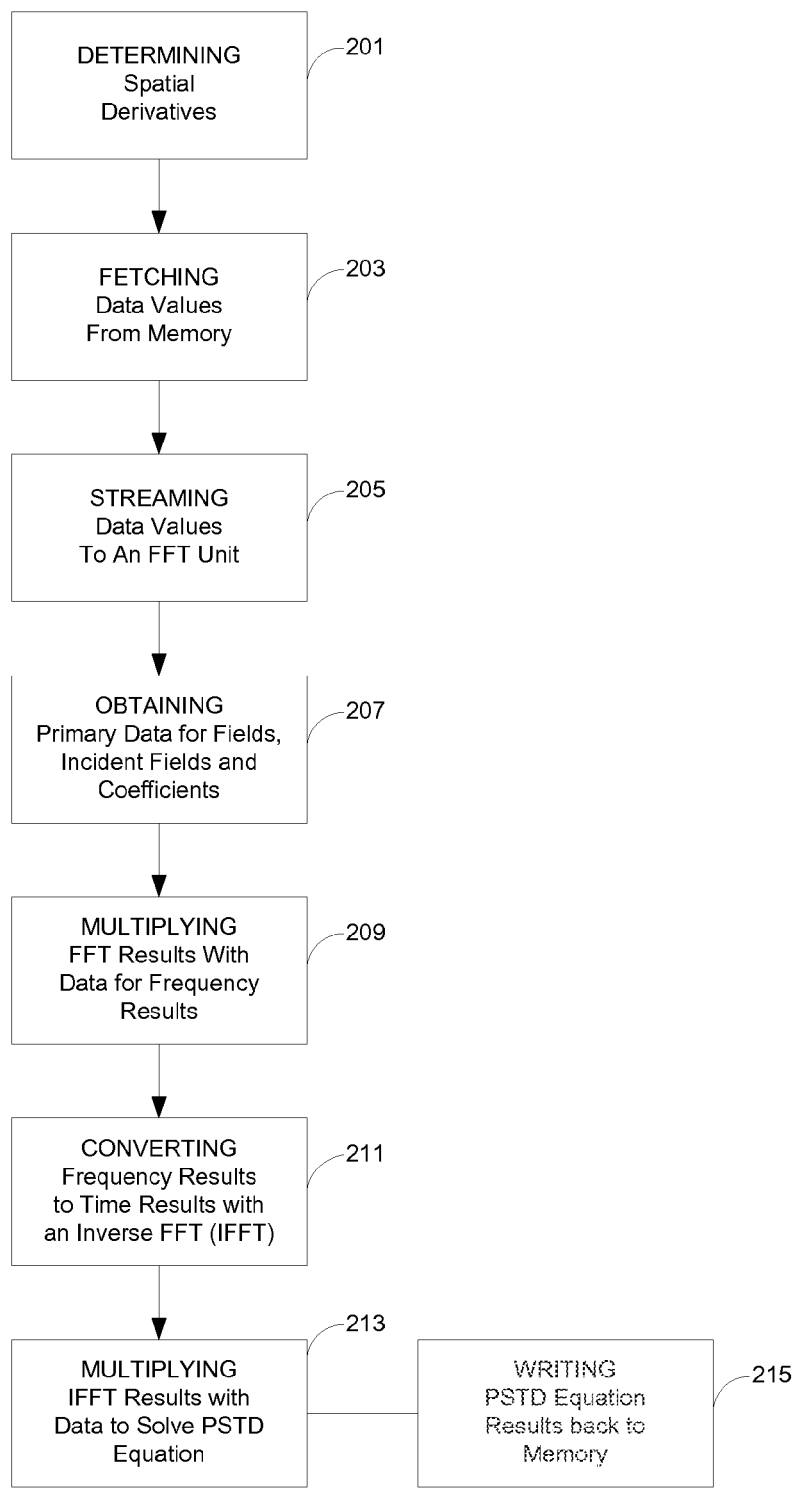
FIG. 2 is flow diagram for a method in accordance to an embodiment of the present invention.

The flow within each computational path begins by determining the spatial derivative needed for the computation, as shown in step 201 of FIG. 2. The necessary values must be fetched from the memory subsystem 18 in step 203 and streamed into an FFT unit 20 that performs the FFT on the values in step 205 of FIG. 2. Depending on the size of the problem being solved and the capabilities of the FFT unit 20, this computation can easily require several thousand cycles. While the FFT is being computed by the FFT unit 20, the other necessary data, including the primary fields, incident fields, and coefficients, can all be fetched from memory subsystem 18 or computed, as shown in step 207 of FIG. 2. This entire computational path will be pipelined to hide much of the latency of the FFT operation. As results begin emerging from the FFT unit 20, the results are streamed through a pipelined a complex multiplication unit 22 that solves the multiplication aspects of equation (2) set forth above, as shown in step 209 of FIG. 2. At this point, the spatial derivatives will have been computed in the frequency domain. The next step in each datapath 12, 14, 16 is to convert the frequency domain result back into the time domain by means of an IFFT unit 24 that performs an IFFT, as shown in step 211 of FIG. 2. IFFT unit 24 will also undergo a several thousand-cycle latency. As results begin emerging from the IFFT unit 24, the results are streamed into a Computation Engine (CE) 26. The CE 26, given the necessary data and the spatial derivative, solves equation (1) set forth above, as shown in step 213 of FIG. 2. Once complete, the fields are written back to the memory subsystem 18 by CE 26, as shown in step 215 of FIG. 2.

It will be apparent to those skilled in the art that various modifications and variations can be made in the hardware implementation of the PSTD method of the present invention and in construction of the hardware without departing from the scope or spirit of the invention.

For example, although FIG. 1 shows three parallel computational datapaths 12, 14, 16, more or less such datapaths may be provided. Fewer datapaths may be implemented to save on hardware, or extra datapaths may be included to increase parallelism. The actual number of datapaths is mostly dependent upon the capabilities of the memory subsystem 18.

Also, the FFT and IFFT units 20, 24 may or may not be co-located with complex multiplication unit 22 and CE unit 26. FFT and IFFT units 20, 24 may be implemented inside of a field-programmable gate-array (FPGA). However, custom FFT/IFFT chips may be purchased or DSP chips may be programmed to solve the FFT/IFFT equations. The latter configurations require DSP chips external to the FPGA. This would result in a more complex printed circuit board and latency in transferring data into and out of the FPGA. However, DSP chips are extremely fast and would save FPGA resources. However, with very advanced FPGAs already in the market, an implementation where the FFT/IFFT operations are performed inside the FPGA is quite possible.

By implementing the PSTD method in hardware, computational speedup is achieved that allows solving problems much faster than current software-based methods and also allows solving problems that were heretofore unsolvable due to time constraints. The hardware implementation of the PSTD method of the present invention may be used in any field or application utilizing a software method based on a pseudo-spectral time-domain approach.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for performing the pseudo-spectral time-domain (PSTD) method on data, comprising:
   a forward fast Fourier transform (FFT) unit calculating a forward fast Fourier transform (FFT) from the data;
   a complex multiplication unit receiving the FFT-processed data and calculating a spatial derivative in the frequency domain from the FFT-processed data;
   an inverse fast Fourier transform (IFFT) unit converting the spatial derivative in the frequency domain from the complex multiplication unit into the time domain;
   a computation engine solving a PSTD equation based upon the spatial derivative in the time domain received from the IFFT unit; and
   a memory subsystem that provides input values to the FFT unit and receives output results from the computation engine,
   wherein input values for the FFT unit are stored in increasing-x, increasing-y and increasing-z patterns in the memory subsystem that allows a burst read of the memory subsystem to maximize throughput.

2. A system as recited in claim 1, wherein the PSTD equation takes the form:

$$E_{ab} = AE_{ab} + B\frac{\partial H_c}{\partial b} + CE_{ab}^{inc},$$

where a, b, and c are directions (x, y, and z), A, B, and C are coefficients based on material properties of a medium, and $E_{ab}^{inc}$ is the incident field associated with the node.

3. A system as recited in claim 1, wherein as the FFT is being calculated, primary fields, incident fields, and coefficients are being fetched by the system.

4. A system as recited in claim 1, wherein the FFT and IFFT units are provided inside a field-programmable gate array (FPGA).

5. A system as recited in claim 4, wherein the FFT and IFFT calculations are performed by a digital signal processing (DSP) chip.

6. A system for performing the pseudo-spectral time-domain (PSTD) method on data, comprising:
   a plurality of forward fast Fourier transform (FFT) units, each FFT unit calculating a forward fast Fourier transform (FFT) from the data;
   a plurality of complex multiplication units, each complex multiplication unit receiving the FFT-processed data from a corresponding FFT unit and calculating a spatial derivative in the frequency domain from the FFT-processed data;
   a plurality of inverse fast Fourier transform (IFFT) units, each IFFT unit converting the spatial derivative in the frequency domain from a corresponding complex multiplication unit into the time domain;
   a plurality of computation engines, each computation engine solving a PSTD equation based upon the spatial derivative in the time domain received from a corresponding IFFT unit; and
   a memory subsystem that provides input values to the FFT unit and receives output results from the computation engine,
   wherein the input values for the FFT unit are stored in increasing-x, increasing-y and increasing-z patterns in the memory subsystem that allows a burst read of the memory subsystem to maximize throughput.

7. A system as recited in claim 6, wherein the PSTD equation takes the form:

$$E_{ab} = AE_{ab} + B\frac{\partial H_c}{\partial b} + CE_{ab}^{inc},$$

where a, b, and c are directions (x, y, and z), A, B, and C are coefficients based on material properties of a medium, and $E_{ab}^{inc}$ is the incident field associated with the node.

8. A system as recited in claim 6, wherein as the FFT is being calculated, primary fields, incident fields, and coefficients are being fetched by the system.

9. A system as recited in claim 6, wherein the plurality of FFT and IFFT units are provided inside a field-programmable gate array (FPGA).

10. A system as recited in claim 9, wherein the FFT and IFFT calculations are performed by a digital signal processing (DSP) chip.

11. A computer hardware configuration for performing the pseudo-spectral time-domain (PSTD) method on data, comprising:
    a forward fast Fourier transform (FFT) unit calculating a forward fast Fourier transform (FFT) from the data;
    a complex multiplication unit receiving the FFT-processed data and calculating a spatial derivative in the frequency domain from the FFT-processed data;
    an inverse fast Fourier transform (IFFT) unit converting the spatial derivative in the frequency domain from the complex multiplication unit into the time domain;
    a computation engine solving a PSTD equation based upon the spatial derivative in the time domain received from the IFFT unit; and
    a memory subsystem that provides input values to the FFT unit and receives output results from the computation engine,
    wherein the input values for the FFT unit are stored in increasing-x, increasing-y and increasing-z patterns in the memory subsystem that allows a burst read of the memory subsystem to maximize throughput.

12. A computer hardware configuration as recited in claim 11, wherein the PSTD equation takes the form:

$$E_{ab} = AE_{ab} + B\frac{\partial H_c}{\partial b} + CE_{ab}^{inc},$$

where a, b, and c are directions (x, y, and z), A, B, and C are coefficients based on material properties of a medium, and $E_{ab}^{inc}$ is the incident field associated with the node.

13. A computer hardware configuration as recited in claim 11, wherein as the FFT is being calculated, primary fields, incident fields, and coefficients are being fetched by the system.

14. A computer hardware configuration as recited in claim 11, wherein the FFT and IFFT units are provided inside a field-programmable gate array (FPGA).

15. A computer hardware configuration as recited in claim 14, wherein the FFT and IFFT calculations are performed by a digital signal processing (DSP) chip.

16. A computer hardware configuration for performing the pseudo-spectral time-domain (PSTD) method on data, comprising:

a plurality of forward fast Fourier transform (FFT) units, each FFT unit calculating a forward fast Fourier transform (FFT) from the data;

a plurality of complex multiplication units, each complex multiplication unit receiving the FFT-processed data from a corresponding FFT unit and calculating a spatial derivative in the frequency domain from the FFT-processed data;

a plurality of inverse fast Fourier transform (IFFT) units, each IFFT unit converting the spatial derivative in the frequency domain from a corresponding complex multiplication unit into the time domain;

a plurality of computation engines, each computation engine solving a PSTD equation based upon the spatial derivative in the time domain received from a corresponding IFFT unit; and a memory subsystem that provides input values to the FFT unit and receives output results from the computation engine, wherein values for the FFT unit are stored in increasing-x, increasing-y and increasing-z patterns in the memory subsystem that allows a burst read of the memory subsystem to maximize throughput.

17. A computer hardware configuration as recited in claim 16, wherein the PSTD equation takes the form:

$$E_{ab} = AE_{ab} + B\frac{\partial H_c}{\partial b} + CE_{ab}^{inc},$$

where a, b, and c are directions (x, y, and z), A, B, and C are coefficients based on material properties of a medium, and $E_{ab}^{inc}$ is the incident field associated with the node.

18. A computer hardware configuration as recited in claim 16, wherein as the FFT is being calculated, primary fields, incident fields, and coefficients are being fetched by the system.

19. A computer hardware configuration as recited in claim 16, wherein the plurality of FFT and IFFT units are provided inside a field-programmable gate array (FPGA).

20. A computer hardware configuration as recited in claim 19, wherein the FFT and IFFT calculations are performed by a digital signal processing (DSP) chip.

* * * * *